United States Patent
Filsfils et al.

(10) Patent No.: US 10,469,372 B2
(45) Date of Patent: Nov. 5, 2019

(54) SEGMENT-ROUTING MULTIPROTOCOL LABEL SWITCHING END-TO-END DATAPLANE CONTINUITY

(71) Applicant: Cisco Technology, Inc., San Jose, CA (US)

(72) Inventors: Clarence Filsfils, Brussels (BE); Stefano Benedetto Previdi, Rome (IT); Peter Psenak, Bratislava (SK); Ketan Jivan Talaulikar, Pune (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/865,570

(22) Filed: Jan. 9, 2018

(65) Prior Publication Data
US 2019/0215266 A1 Jul. 11, 2019

(51) Int. Cl.
| | |
|---|---|
| *H04L 12/723* | (2013.01) |
| *H04L 12/721* | (2013.01) |
| *H04L 12/729* | (2013.01) |
| *H04L 12/707* | (2013.01) |
| *H04L 12/741* | (2013.01) |
| *H04L 12/703* | (2013.01) |

(52) U.S. Cl.
CPC .......... *H04L 45/507* (2013.01); *H04L 45/125* (2013.01); *H04L 45/22* (2013.01); *H04L 45/74* (2013.01); *H04L 45/24* (2013.01); *H04L 45/28* (2013.01)

(58) Field of Classification Search
CPC ..... H04L 45/12; H04L 45/123; H04L 45/124; H04L 45/50
See application file for complete search history.

(56) References Cited

U.S. PATENT DOCUMENTS

| | | | |
|---|---|---|---|
| 7,885,259 B2 | 2/2011 | Filsfils | |
| 8,553,562 B2 | 10/2013 | Allan et al. | |
| 9,100,328 B1 * | 8/2015 | Atlas | H04L 45/28 |

(Continued)

OTHER PUBLICATIONS

S. Previdi, Ed., et al., "IS-IS Extensions for Segment Routing", draft-ietf-isis-segment-routing-extensions-12, IS-IS for IP Internets, Internet-Draft, IETF Trust, Apr. 27, 2017, 41 pgs.

(Continued)

*Primary Examiner* — Scott M Sciacca
(74) *Attorney, Agent, or Firm* — Edell, Shapiro & Finnan, LLC (57) ABSTRACT

A method is performed at a source node in a network of nodes configured with a link state protocol, and in which at least some of the nodes are enabled for multiprotocol label switching (MPLS). The node discovers and stores a link state topology representing the nodes of the network, links between the nodes, path-costs for the links, and whether each link is enabled or not enabled for MPLS. The node determines one or more shortest paths from the source node to a destination node among the nodes based on traversing the link state topology and, while the node traverses the link state topology, detects whether each shortest path supports or does not support MPLS end-to-end dataplane continuity. The node programs an IP dataplane with each shortest path, and programs an MPLS dataplane with ones of the one or more shortest paths that support the end-to-end MPLS continuity.

20 Claims, 6 Drawing Sheets

(56) References Cited

U.S. PATENT DOCUMENTS

| | | | |
|---|---|---|---|
| 2011/0007629 A1 | 1/2011 | Atlas et al. | |
| 2013/0315580 A1* | 11/2013 | Boertjes | H04J 14/0204 |
| | | | 398/5 |
| 2016/0021000 A1 | 1/2016 | Previdi et al. | |
| 2016/0315847 A1* | 10/2016 | Zhang | H04L 12/6418 |
| 2017/0346718 A1 | 11/2017 | Psenak et al. | |

OTHER PUBLICATIONS

P. Psenak, Ed., et al., "ISIS Segment Routing Flexible Algorithm", draft-hegdeppsenak-isis-sr-flex-algo-01.txt, Network Working Group, Internet-Draft, IETF Trust, Oct. 23, 2017, 12 pgs.

* cited by examiner

FIG.1

202 — A adds in TENT: B(via B, 10, M=1) and D(via D, 10, M=1)
204 — A adds in PATH: B(via B, 10, M=1)
206 — A adds in TENT: C(via B, 20, M=1)
208 — A adds in PATH: D(via D, 10, M=1)
210 — A adds in TENT: E(via D, 20, M=1)
212 — A adds in PATH: C(via B, 20, M=1)
214 — A adds in TENT: F(via B, 30, M=0)
216 — A adds in PATH: E(via D, 20, M=1)
218 — A modifies TENT: F(via B, 30, M=0) and (via D, 30, M=1)
220 — A adds in PATH: F(via B, 30, M=0) and (via D, 30, M=1)
222 — A adds in PATH: Z(via B, 30, M=0) and (via D, 30, M=1)

} MODIFIED DIJKSTRA'S COMPUTATION

SEGMENT-ROUTING MULTIPROTOCOL LABEL SWITCHING END-TO-END DATAPLANE CONTINUITY

TECHNICAL FIELD

The present disclosure relates to shortest cost path determination for networks that support link state protocols and multiprotocol label switching.

BACKGROUND

Nodes of a network that employs an interior gateway protocol (IGP) may use a link state routing protocol, such as Intermediate System-to-Intermediate System (IS-IS) or Open Shortest Path First (OSPF), to forward data packets, such as Internet Protocol (IP) packets. The nodes may also employ segment-routing (SR)-multiprotocol label switching (MPLS) (SR-MPLS) to forward MPLS packets. The nodes determine shortest cost paths in the network for forwarding the IP packets. Using a conventional technique to determine the shortest cost paths, the nodes initially discover a link state topology of the network, and then apply a conventional shortest path algorithm, such as the Dijkstra's computation, to the link state topology. This approach does not take into account the fact that some of the nodes may not support MPLS, which results in shortest paths that do not support MPLS end-to-end dataplane continuity, and thus that drop MPLS packets. To take into account MPLS dataplane continuity, another conventional shortest path algorithm uses multiple types of network topologies, including both the link state topology and an MPLS topology, which adds substantial complexity.

DESCRIPTION OF EXAMPLE EMBODIMENTS

Overview

In one embodiment, a method provided that is performed at a source node in a network of nodes configured to implement a link state protocol, and in which at least some of the nodes are enabled for MPLS. The method includes discovering and storing a link state topology representing the nodes of the network, links between the nodes, path-costs for the links, and whether each link is enabled or not enabled for MPLS. The method also includes determining one or more shortest paths from the source node to a destination node among the nodes based on traversing the link state topology and, while traversing the link state topology, detecting whether each shortest path supports or does not support MPLS end-to-end dataplane continuity. The method further includes programming an IP dataplane with each shortest path, and programming an MPLS dataplane with ones of the one or more shortest paths that support the MPLS end-to-end continuity.

Example Embodiments

Figure 1:
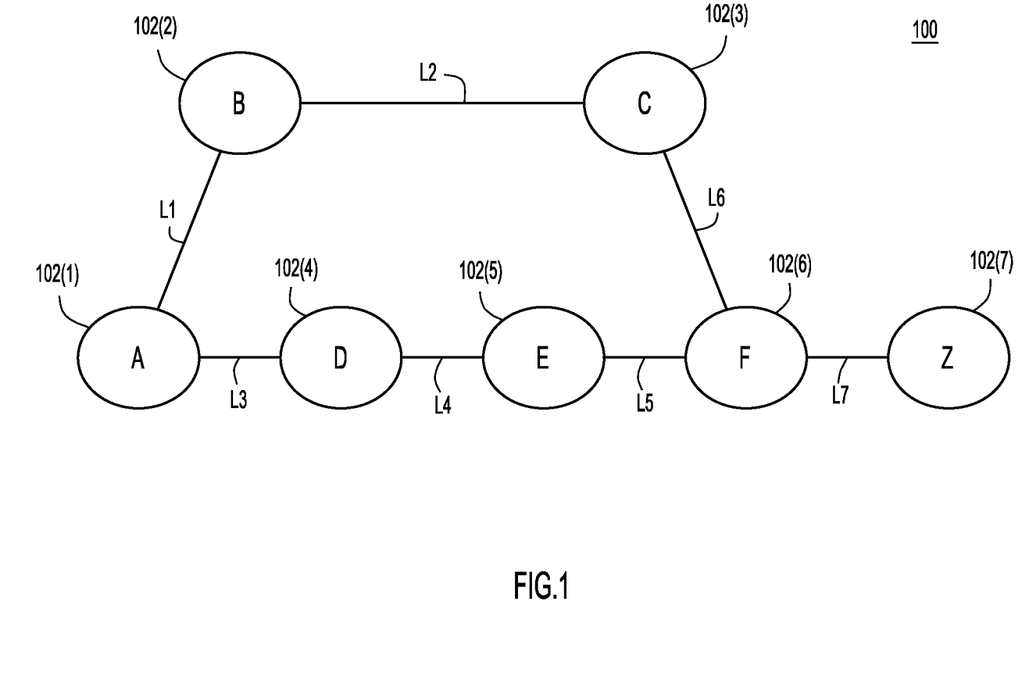
FIG. 1 is a block diagram of a communication network in which network devices (nodes) determine shortest cost paths, while also detecting MPLS end-to-end dataplane continuity along those paths, according to an example embodiment.

With reference to FIG. 1, a block diagram is shown of an example communication network 100 in which network devices may determine shortest cost paths, while also detecting MPLS end-to-end dataplane continuity (also referred to as "end-to-end MPLS dataplane continuity") along those paths. Network 100 includes multiple network devices or nodes 102(1)-102(7) (also labeled as nodes A-F and Z, i.e., A-Z), which may include network switches and/or routers. Nodes A-Z are connected to each other via multiple communication links L1-L7 (also referred to as links A-B, B-C, C-D, and so on) as shown in FIG. 1, such that some nodes are connected directly to each other, while others are only connected indirectly to each other. For example, node A is directly connected to node B over link L1 (A-B), and indirectly connected to node C over links L1 (A-B) and L2 (B-C). All of nodes A-Z employ/implement a link state routing protocol (also referred to simply as a "link state protocol") to forward data packets, such as IP packets, across network 100. That is, each of nodes A-Z is enabled for the link state protocol, and is said to have its links "enabled for link state protocol." The link state protocol may include, but is not limited to, Intermediate System-to-Intermediate System (IS-IS), Open Shortest Path First (OSPF), and Border Gateway Protocol (BGP)-Link State (LS) (BGP-LS). It is understood that network 100 is shown by way of example in FIG. 1, and may include many more nodes interconnected in accordance with many different topologies.

Generally, as part of implementing the link state protocol across network 100, each node A-Z discovers and stores a map of the link state connectivity or link state topology for the network 100, in a form of a link state graph. The link state topology or graph shows which nodes are connected to which other nodes, and assigns path cost metrics (referred to simply as "path costs") to each of the links L1-L7 connecting the various nodes. Each node A-Z may employ a variety of mechanisms to construct its view, or link state topology, of network 100. For example, nodes A-Z may send to/receive from each other type-length-value (TLV) reachability messages (referred to as "reachability TLVs" or "reachability TLV packets"). The reachability TLV includes, relative to the node that sends the TLV, source and destination addresses, a list of neighbor (node) addresses, IP versions supported by the node, reachability information for the links connected to the node (e.g., path cost metrics), and so on. Each node constructs the link state topology based on the reachability TLVs that the node receives from its neighbors.

Using a shortest path algorithm that traverses the link state topology/graph, and the path costs therein, each node A-Z independently calculates one or more lowest cost paths, referred to herein as a "shortest paths," from itself to each other node/destination in the network. Each node then programs the shortest cost path(s) into a link state dataplane of the node, i.e., into routing and forwarding tables of the node, such as an information base (RIB) and a forwarding information base (FIB). When IP packets arrive at each node, the node forwards the packets to their destinations along edges of the shortest paths as programmed into the link state dataplane.

While all of nodes A-Z implement the link state protocol, at least some of nodes A-Z, i.e., one or more of the nodes, may also implement SR-MPLS (also referred to herein simply as "MPLS"). For example, all of nodes A-Z may support MPLS, or only a subset of the nodes may support MPLS. The nodes that support or do not support MPLS are said to have their links "enabled with MPLS dataplane" or "not enabled with MPLS dataplane," respectively. MPLS encapsulates data packets of various network protocols with one or more MPLS labels, to form MPLS packets. For example, MPLS may encapsulate IP packets with the one or more MPLS labels to form the MPLS packets. An MPLS enabled node directs MPLS packets received at the node to a next node over a link connecting the nodes based on the MPLS label(s) in the MPLS packets, rather than network addresses. Thus, with MPLS, packet forwarding decisions are based on the MPLS labels in the MPLS packets. If a given node is not MPLS enabled, it cannot forward the MPLS packets.

Conventional shortest path algorithms that traverse the link state topology/graph to construct the shortest paths, such as the conventional Dijkstra computation, do not take into account whether the links L1-L7 are enabled or are not enable for MPLS, i.e., whether the nodes connected to those links are MPLS capable or not MPLS capable. Thus, the conventional shortest path algorithms construct shortest paths having end-to-end connectivity for packets routed according to the link state protocol, but not necessarily for packets routed according to MPLS, i.e., for MPLS packets. In cases where one or more of links L1-L7 are not enabled for MPLS, the shortest paths may not have MPLS dataplane end-to-end connectivity. When shortest paths lacking MPLS dataplane end-to-end connectivity are programmed into forwarding tables, forwarding MPLS packets along the programmed paths may lead to unwanted dropping or "black holing" of MPLS packets at nodes/links in the shortest path(s) that do not support MPLS.

Consider the following example configuration of nodes/links of network 100 for computation of shortest paths at/from node A:

a. Links L1-L7 are all enabled for the link state protocol (e.g., IS-IS) with the same path cost metrics "10";

b. Links L1-L7 are all enabled with MPLS dataplane, except for link L6 (C-F); and c. Node Z advertises addresses 7.7.7.7/32 (used by IS-IS) with Prefix Segment Identifier (SID) 17777 (used by MPLS).

When node A uses the conventional Dijkstra's computation on the above configuration, the computation finds multiple, equal, shortest paths from node A to node Z. Thus, node A programs or installs those paths as follows:

a. Two IP paths to 7.7.7.7/32: via B and via D. This is a correct, because both paths provide link state end-to-end connectivity; and b. Two MPLS paths to 17777: via B and via D. This is incorrect, because, while the path via D provides MPLS dataplane end-to-end connectivity, the path via B does not provide MPLS dataplane end-to-end connectivity.

Node A attempts to use equal-cost multi-path routing (ECMP) on the two installed paths. ECMP is a routing strategy in which next-hop packet forwarding to a single destination can occur over multiple "best/shortest paths" having equal path costs. ECMP may be used to load-balance forwarding of packets between the multiple best/shortest paths. As indicated in the example above, there is no MPLS dataplane end-to-end continuity along the path via B, i.e., A-B-C-F-Z. Hence, the path via B leads MPLS-traffic carrying more than one MPLS label along that path into a "black hole" at C, due to the lack of MPLS dataplane on link L6 (C-F). That is, MPLS traffic is dropped on this link.

Accordingly, embodiments presented herein (i) employ an efficient shortest path algorithm to determine one or more shortest paths between nodes of network 100 based on a traversal of a link state topology for the network and its associated path costs, while concurrently detecting MPLS dataplane end-to-end connectivity along the one or more shortest paths, and (ii) program forwarding/routing tables with the shortest path(s) according to the detected MPLS dataplane end-to-end connectivity. The embodiments have the following features and advantages:

a. The embodiments introduce a new reachability TLV that is exchanged between the nodes before determining shortest paths. The new reachability TLV enables the nodes to track MPLS dataplane capability on a per-adjacency basis (the terms "link" and "adjacency" are interchangeable and synonymous);

b. The embodiments use a modified Dijkstra's computation that is applied only once to a link state topology of the network to determine ECMP-aware shortest paths. That is, only one modified Dijkstra's computation is used per link state topology;

c. Using information conveyed by the new reachability TLV, the modified Dijkstra's computation tracks MPLS dataplane end-to-end connectivity along, i.e., while computing, the shortest path(s); and d. The embodiments traverse the link state topology, without modification, and do not require multiple/different topologies. For example, the embodiments do not require both the link state topology and an MPLS topology.

The above-mentioned new reachability TLV indicates the MPLS capability of each adjacency/link associated with the node that sends the new reachability TLV, i.e., whether MPLS is enabled or not enabled on each adjacency. In an example, the new reachability TLV may include a new reachability sub-TLV that indicates an adjacency-capability (or multi-capability) for each adjacency associated with the node that sends the new reachability TLV. The adjacency-capability may include a multi-bit array representing the possible dataplanes active on each adjacency, e.g., one bit position for IPv4, one bit position for IPv6, and one bit position for MPLS (referred to as an "M" bit), where each bit position carries a respective protocol enabled/not enabled flag, e.g., 1=enabled, 0=enabled.

An a priori exchange of new reachability TLVs between nodes of network 100 provides each node with information sufficient to construct the link state topology for network 100, and to also maintain a record of MPLS dataplane continuity or lack thereof on a per-node, per-adjacency basis across the network, i.e., to track the MPLS dataplane on the per-adjacency basis. The record of MPLS dataplane support for a given node in the link state topology may be a copy of the M bit from the new reachability TLV received from the given node. The M bit or "M flag," for which M=1 indicates MPLS continuity at the given node (i.e., the given node is MPLS enabled), while M=0 indicates MPLS discontinuity (i.e., the given node is not MPLS enabled). The modified Dijkstra's computation considers/tracks the respective M flags as the computation traverses the link state topology node-by-node to build each shortest path(s), and marks each shortest path with the traversed M flags. If a shortest path is not marked with any M=0 flag, i.e., includes all M=1 flags, the shortest path is end-to-end MPLS dataplane enabled. In contrast, if a shortest path includes an M=0 flag, the shortest path is not end-to-end MPLS dataplane enabled.

Figure 2:
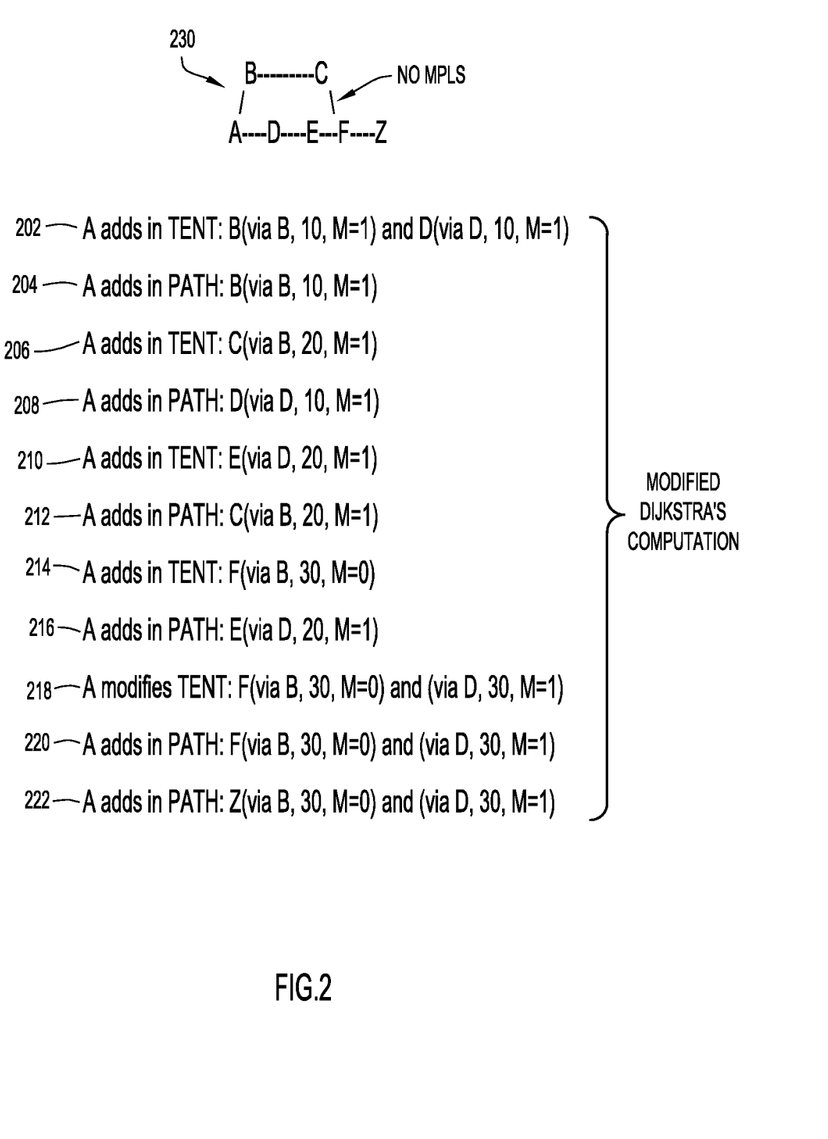
FIG. 2 is an illustration of operations of a modified Dijkstra's computation to determine equal-cost multi-path routing (ECMP) shortest paths between the nodes in the network, while detecting MPLS dataplane end-to-end continuity along those paths, according to an example embodiment.

With reference to FIG. 2, there is an illustration of example operations 202-222 of the modified Dijkstra's computation as performed at node A to determine ECMP-aware shortest paths from node A to node Z. In general, each of nodes A-Z employs the modified Dijkstra's computation to determine shortest paths from each node to each other node. Depending on topology, the modified Dijkstra's computation may only find a single shortest path. For convenience, FIG. 2 also shows a portion 230 of a link state topology for network 100. Node A is referred to as a "source node" and node Z is referred to as a "destination node" of each shortest path between the two nodes. The shortest path is represented as a sequence of nodes and/or links from node A (the source node) to node Z (the destination node). The example of FIG. 2 assumes that node A has exchanged the new reachability TLVs with other nodes in network 100 and is thus aware of the link state topology of the network and the MPLS capability (i.e., M flags) of the network on a per-link, per node basis. That is, node A has detected that all of links L2-L7 support MPLS dataplane, except for link L6 (link C-F). Node A has recorded the respective M flags (M=0, M=1) for each node/link, i.e., M=0 for link C-F, and M=1 for all other links.

Generally speaking, in search of shortest paths, the modified Dijkstra's computation iteratively visits/traverses each node and neighbors of each node in the link state topology to construct paths with associated path costs, and marks the paths with the M flag(s) of the traversed nodes, as described below.

At 202, the computation first visits node A (the start node), and finds/identifies its two directly connected neighbors B and D. Neighbors B and D represent two tentative (TENT) shortest paths from node A to node B over link A-B and from node A to node D over link A-D. Both paths have equal path costs of 10, and both paths are MPLS enabled. The computation records the two tentative paths (i.e., links A-B and A-D), their respective path costs, and their respective M flags, as shown in FIG. 2. The computation computes the path cost associated with/for each neighbor as a cumulative sum of all of the path costs leading from node A (the source node) to the neighbor. That is, the computation adds together the path costs for all of the links between the source node and the neighbor.

At 204, exploring path A-B, the computation visits node B. The computation records the path cost (10) for link A-B, and the M flag associated with link A-B (M=1), as shown in FIG. 2.

At 206, exploring beyond path A-B, the computation visits node B, and identifies its direct neighbor C over path B-C, i.e., node A finds node C via node B. The computation records the path cost (20) for a tentative path A-B-C, and maintains the M flag (M=1) associated with the path because all links A-B and B-C in the path A-B-C are MPLS enabled.

At 208, exploring path A-D, the computation visits node D. The computation records the path cost (10) for link A-D, and the M flag (M=1) associated with link A-D.

At 210, exploring beyond path A-D, the computation visits node D, and identifies its direct neighbor E over path D-E, i.e., node A finds node E via node D. The computation records the path cost (20) for tentative path A-D-E, and maintains the M flag (M=1) associated with the path because all links A-D and D-E in the path A-D-E are MPLS enabled.

At 212, revisiting beyond path A-B (from 206), the computation visits node B, and identifies its direct neighbor C over path B-C, i.e., node A finds node C via node B. The computation records the path cost (20) for path A-B-C, and maintains the M flag (M=1) associated with the path because all links A-B and B-C in the path A-B-C are MPLS enabled.

At 214, exploring beyond path B-C, the computation visits node C, and identifies its direct neighbor F over path C-F, i.e., node B finds node F via node C. The computation records the path cost (30) for path A-B-C-F, and records M flag (M=0) associated with link C-F because link C-F (in the path A-B-C-F) is not MPLS enabled.

At 216, revisiting beyond path A-D (from 210), the computation visits node D, and identifies its direct neighbor E over path D-E, i.e., node A finds node E via node D. The computation records the path cost (20) for path A-D-E, and maintains the M flag (M=1) associated with the path because all links A-D and D-E in the path A-D-E are MPLS enabled.

At 218, the computation enters a modification to two tentative ECMP shortest paths as follows:
  a. Path to F via B (i.e., path A-B-C-F), including path cost 30, and M=0. This path does not support MPLS dataplane end-to-end connectivity; and
  b. Path to F via D (i.e., path A-D-E-F), including path cost 30, and M=1. This path supports MPLS dataplane end-to-end connectivity.

At 220, revisiting the two tentative ECMP shortest paths as modified at 218, the computation solidifies these as the shortest paths explored thus far in the computation.

At 222, exploring beyond each of the two shortest paths solidified at 220, the computation visits node F and identifies its direct neighbor Z, i.e., destination node Z. The computation identifies the following final ECMP paths from A-Z:
  a. A first shortest path A-B-C-F-Z, with path cost 30 (from A-F), and M=0, i.e., marked to indicate that MPLS dataplane end-to-end connectivity is not supported; and
  b. A second shortest path A-D-E-F-Z, with path cost 30 (from A-F), and M=1, i.e., marked to indicate that MPLS dataplane end-to-end connectivity is supported.

After operation 222, node A programs its forwarding and routing tables, the FIB and the RIB, according to the marked ECMP paths. That is, node A installs forwarding paths into the FIB/RIB tables in accordance with the results of the modified Dijkstra's computation.

When programming the IP dataplane in the FIB, node A installs in the FIB all of the link state ECMP paths provided by the modified Dijkstra's computation. For example, node A may install the following entry in the FIB for link state forwarding:

7.7.7.7/32=>via B OR via D.

On the other hand, when programming the SR-MPLS dataplane in the FIB, node A installs in the FIB only the ECMP paths marked with M=1, i.e., only the ECMP path(s) that provide MPLS dataplane end-to-end connectivity. For example, node A may install the following entry in the FIB for MPLS forwarding:

17777=>via D and only via D.

Node A programs an entry in the RIB for link state routing for each ECMP path.

The description of FIG. 2 above assumes that nodes A-Z initially exchange the new reachability TLVs to discover MPLS support capability for each of nodes A-Z. In an alternative embodiment, nodes A-Z exchange an SR-capabilities sub-TLV as defined in Internet Engineering Task Force (IETF) draft-ietf-isis-segment-routing-extensions-14, instead of the new reachability TLV. The alternative embodiment assumes that if nodes, e.g., node A and node B, report a capability "I=1," as defined in the IETF draft, then an ISIS/SR adjacency between nodes A and B supports the MPLS dataplane, because the draft IETF states:

I-Flag: MPLS IPv4 flag. If set, then the router is capable of processing SR-MPLS encapsulated IPv4 packets on all interfaces.

If the new reachability sub-TLV is not present for an adjacency A, then a node that implements the modified Dijkstra's computation makes an implicit assumption that the link over which the adjacency is formed supports MPLS dataplane. This way, when the new reachability sub-TLV is not present, the implicit assumption is made and the new reachability sub-TLV is unnecessary for MPLS support discovery. On the other hand, when the new reachability TLV (or its sub-TLV) is present, the extra information is taken into account by the nodes that are enabled to perform the MPLS end-to-end dataplane continuity detection, and those nodes use this extra information to remove broken paths from ECMP shortest paths (for MPLS rewriting or re-programming). This does not present a network-wide problem because the process of determining shortest paths involves removing broken paths from ECMP shortest path sets.

Embodiments presented herein may be extended to track the support of SR versus LDP control-plane on a per IGP adjacency basis. In this extension, three bits may be tracked on each adjacency, as follows: (i) is there LDP control-plane (CP) (L)?, (ii) is there SR-MPLS CP (S)?, and (iii) is there MPLS dataplane (M)?

Figure 3:
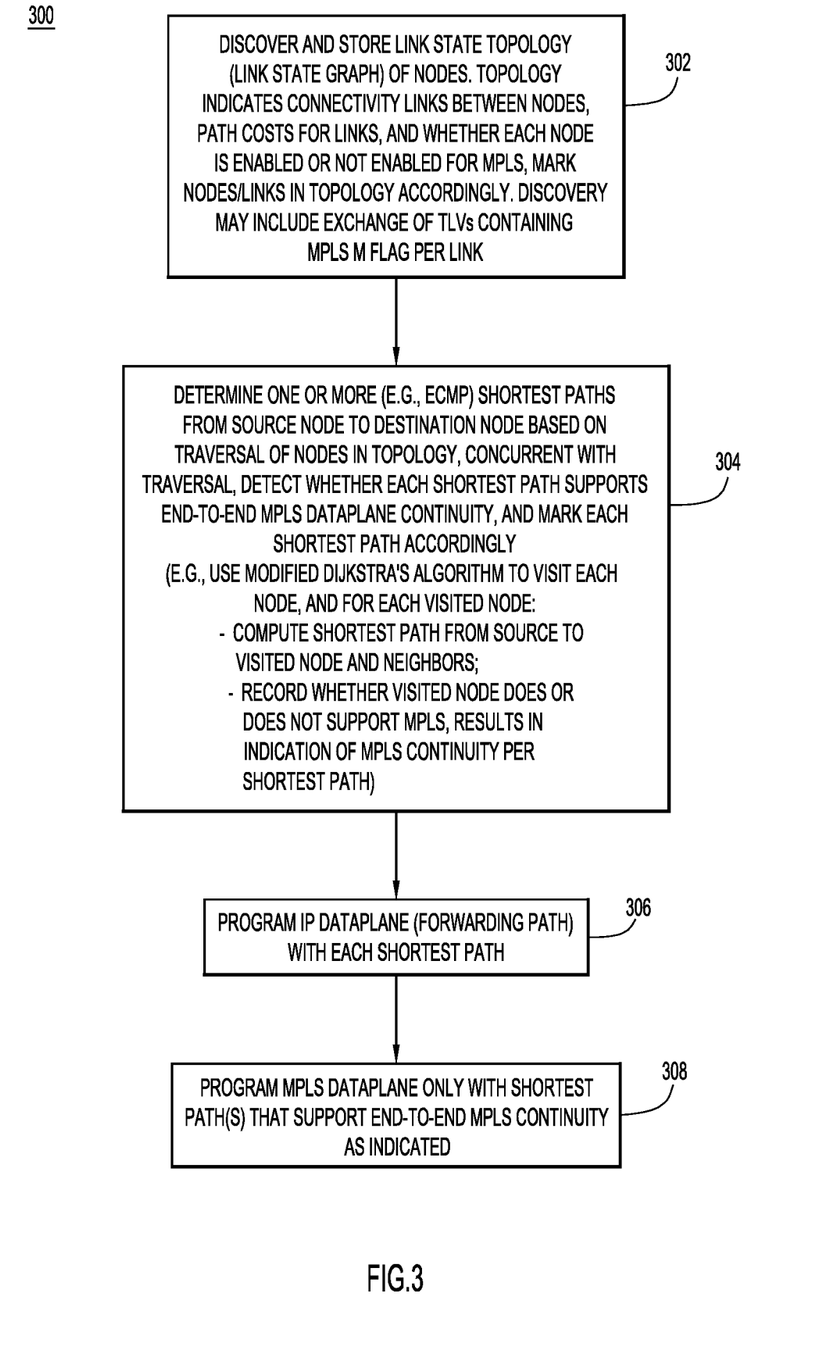
FIG. 3 is a flowchart of a method of determining shortest paths using the modified Dijkstra's computation, and programming dataplane/forwarding paths based on results of the computation, as performed at each node of the network, according to an embodiment.

With reference to FIG. 3, there is a flowchart of an example method 300 of determining shortest paths using the modified Dijkstra's computation, and programming forwarding paths based on results of the computation, performed by each node (e.g., node A) of network 100.

At 302, the node discovers and stores in memory of the node a link state topology (i.e., a link state graph) of the nodes in network 100. The link state topology identifies the nodes, the connectivity links/adjacencies between the nodes, path costs for the links, and whether each node and its associated links are enabled or are not enabled for MPLS, i.e., the nodes and the links are marked with the M flag. In an embodiment, the node discovers the link state topology through an exchange of new reachability TLVs with other nodes in network 100, i.e., sending the TLVs to the other nodes and receiving the TLVs from the other nodes.

At 304, the node determines one or more (e.g., ECMP) shortest paths from itself (as the source node) to a destination node based on a traversal of the nodes and the links as represented in the link state topology, taking into account the path costs of the traversed links. Concurrent with the traversal, the node detects whether successive links comprising each shortest path support MPLS end-to-end dataplane continuity. As part of the detecting, the node marks/indicates whether each shortest path does or does not support MPLS end-to-end dataplane continuity. In an embodiment, the node uses the modified Dijkstra's computation described above to perform operation 304. The modified Dijkstra's computation visits each node of the topology, and for each visited node:
   a. Computes shortest path(s) from the source node to the visited node and neighbors of the visited node to arrive at the shortest path(s); and
   b. Records whether the visited node is or is not enabled for MPLS, which results in an indication of whether each shortest path does or does not support MPLS end-to-end dataplane continuity. Thus, the computation tracks the M flag along each shortest path as it is being constructed.

At 306, the node programs an IP dataplane (forwarding path) with each shortest path resulting from 304.

At 308, the node programs the MPLS dataplane only with shortest path(s) that support MPLS end-to-end dataplane continuity as indicated from 304.

Figure 4:
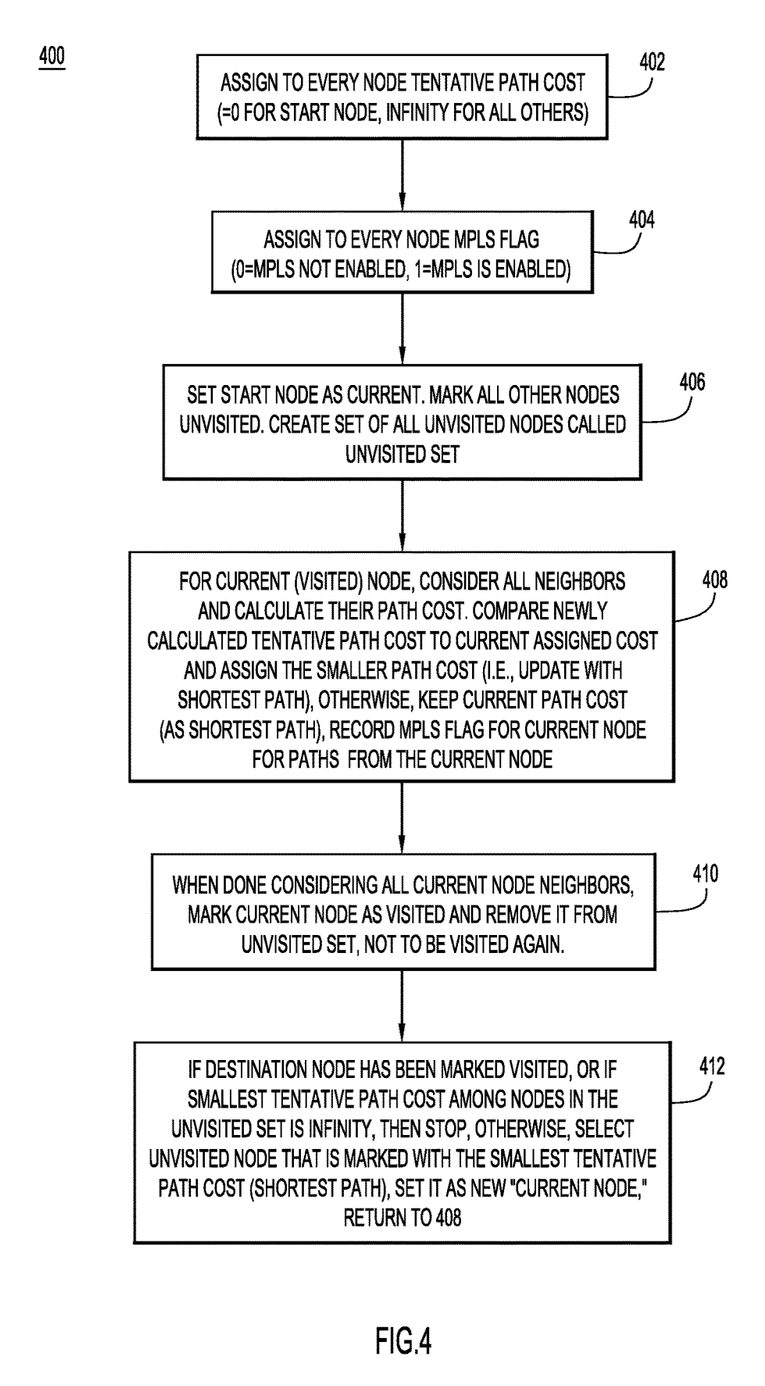
FIG. 4 shows operations expanding on the modified Dijkstra's computation of FIG. 3, according to an example embodiment.

With reference to FIG. 4, there is shown example operations 400 expanding on the modified Dijkstra's computation (MDC) (operation 304 in FIG. 3).

At 402, the MDC assigns to every node a respective tentative path cost (=0 for a start node (e.g., node A), =infinity for all other nodes).

At 404, the MDC imports from the link state topology the M flags, and assigns to every node/associated link the corresponding M flag (0=MPLS is not enabled, 1=MPLS is enabled).

At 406, the MDC sets a start node as current, marks all other nodes as unvisited, and creates a set of all unvisited nodes called an unvisited set.

At 408, the MDC, for the current (visited) node:
   a. Considers all neighbors and calculates their tentative path costs; and
   b. Compares each newly calculated tentative path cost to a current assigned path cost and assigns the smaller path cost (i.e., updates the shortest path cost with the smaller path cost), otherwise, keeps the current path cost (as the shortest path), and records the M flag(s) for the links comprising the shortest paths.

At 410, the MDC, when done considering all current node neighbors, marks the current node as visited, and removes it from the unvisited set, so as not to be visited again.

At 412, if the destination node has been marked as visited, or if the smallest tentative path cost among nodes in the unvisited set is infinity, then stop, otherwise, select the unvisited node that is marked with the smallest tentative path cost (shortest path), set it as the new "current node," and return to 408.

Figure 5:
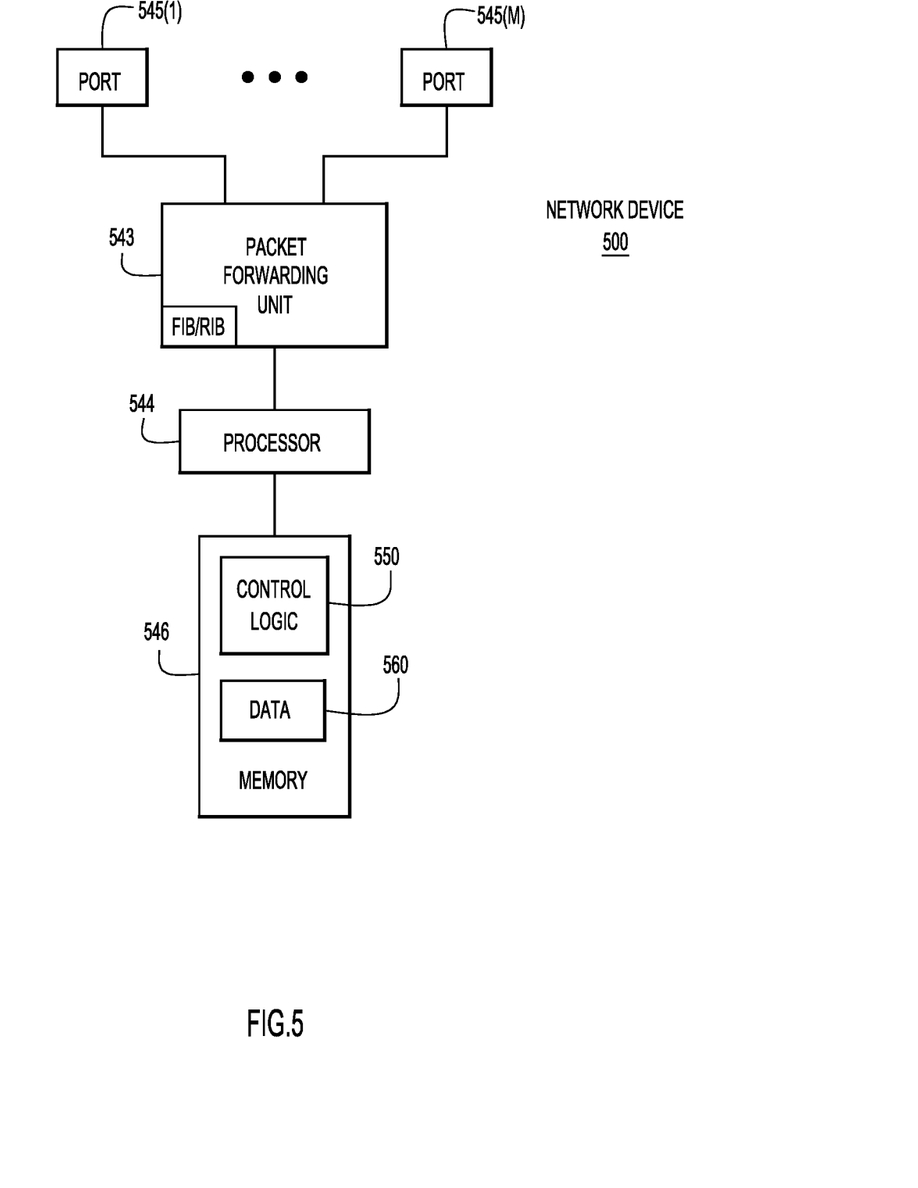
FIG. 5 is a block diagram of a network device representative of each of the nodes of the network, according to an example embodiment.

With reference to FIG. 5, there is a block diagram of an example network device 500, representative of each of nodes A-Z, configured to implement the embodiments presented herein. Network device 500 comprises a plurality of network input/output (I/O) ports 542(1)-542(M) to send traffic (e.g., IP packets/MPLS packets) to a network and receive traffic (e.g., IP packets/MPLS packets) to the network, a packet forwarding/processing unit 543 coupled to the network I/O ports, a network processor 544 (also referred to simply as "processor") coupled to the network I/O ports and/or the packet forwarding/processing unit, and a memory 546 coupled to the processor. The packet forwarding/processing unit 543 is, for example, one or more application specific integrated circuits (ASICs) that include packet buffers, packet queues, an FIB table, an RIB table, and other control logic for performing packet forwarding operations. The processor 544 is a microcontroller or microprocessor that is configured to perform higher level controls of switch 106. To this end, the memory 546 stores software instructions that, when executed by the processor 544, cause the processor 544 to perform a variety of operations including operations described herein. For example, the memory 546 stores instructions for control logic 550 to perform operations described in connection with FIG. 2-4, including the modified Dijkstra's computation. Control logic 550 may also include logic components in packet forwarding unit 543. Memory 546 also stores data 560 used and generated by logic 550. Such data may include network link state topology information including path costs, shortest path information (node sequences), and MPLS enabled/disabled flags per node and per shortest path.

Figure 6:
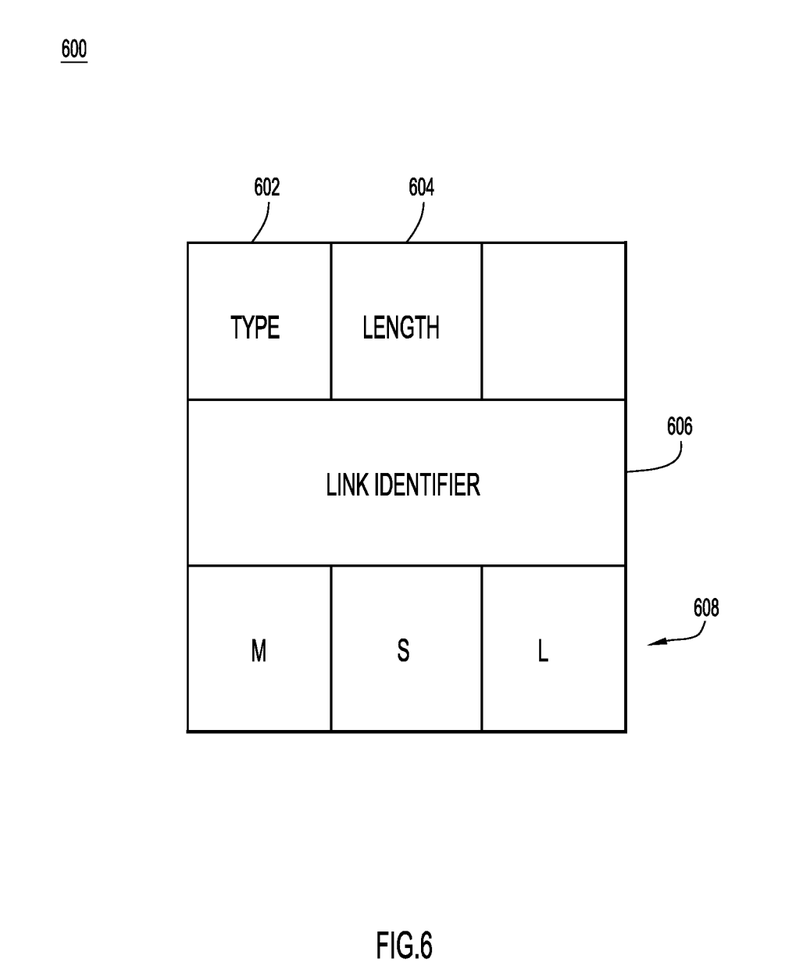
FIG. 6 is an illustration of a new reachability type-length-value (TLV)/message, according to an example embodiment.

With reference to FIG. 6, there is an illustration of an example new reachability message or TLV 600 originated at a node and sent to other nodes of network 100. Reachability message 600 includes: a type field 602 that indicates that the message is the new reachability message; a length field 604 indicating a length or size of the message; a link identifier field 606 identifying one or more links/adjacencies to which the reachability message pertains; and a multi-bit flag field 608 including (i) an M flag to indicate whether MPLS dataplane is supported on the identified links, (ii) an S flag to indicate whether SR-MPLS is supported on the identified links, and (iii) an L flag to indicate whether LDP-MPLS is supported on the identified links. In an example, if a given flag is set=1 or 0, the corresponding mode is supported or is not supported, respectively. Message 600 may also include source and destination IP addresses, as well as a list of IP addresses of neighboring nodes. Message 600 may include a sub-TLV to convey flag field 608.

In summary, embodiments presented herein enable algorithms applied to the link state protocol/topology to detect MPLS end-to-end dataplane continuity of individual ECMP paths without adding either multi-topology complexity or computational cost to the Dijkstra's computation. The embodiments automate pruning of non-end-to-end continuous MPLS ECMP paths from MPLS FIB entries. Hence, the embodiments support an MPLS-dataplane enabled topology as a subset of the IP/IGP topology. The embodiments do not add IGP Dijkstra's computations, do not use of multi-topologies, provide an automated solution, are lightweight, and represent a scalable addition to the link-state flooding and database. The embodiments may be seamlessly inserted into existing IGP/SR deployments.

In one form, a method is provided comprising: at a source node in a network of nodes configured to implement a link state protocol, at least some of the nodes enabled for multiprotocol label switching (MPLS): discovering and storing a link state topology representing the nodes of the network, links between the nodes, path-costs for the links, and whether each link is enabled or not enabled for MPLS; determining one or more shortest paths from the source node to a destination node among the nodes based on traversing the link state topology and, while traversing the link state topology in the determining, detecting whether each shortest path supports or does not support MPLS end-to-end dataplane continuity; programming an Internet Protocol (IP) dataplane with each shortest path; and programming an MPLS dataplane with ones of the one or more shortest paths that support the end-to-end MPLS continuity.

In another form, an apparatus is provided comprising: multiple ports of a source node in a network of nodes configured to implement a link state protocol, at least some of the nodes enabled for multiprotocol label switching (MPLS); and a processor coupled to the multiple ports and configured to perform: discovering and storing a link state topology representing the nodes of the network, links between the nodes, path-costs for the links, and whether each link is enabled or not enabled for MPLS; determining one or more shortest paths from the source node to a destination node among the nodes based on traversing the link state topology and, while traversing the link state topology in the determining, detecting whether each shortest path supports or does not support MPLS end-to-end dataplane continuity; programming an Internet Protocol (IP) dataplane with each shortest path; and programming an MPLS dataplane with ones of the one or more shortest paths that support the end-to-end MPLS continuity.

In yet another form, computer readable media is provided. The computer readable media is encoded with instructions that, when executed by a processor of a source node in a network of nodes configured to implement a link state protocol, at least some of the nodes enabled for multiprotocol label switching (MPLS), cause the processor to perform: discovering and storing a link state topology representing the nodes of the network, links between the nodes, path-costs for the links, and whether each link is enabled or not enabled for MPLS; determining one or more shortest paths from the source node to a destination node among the nodes based on traversing the link state topology and, while traversing the link state topology in the determining, detecting whether each shortest path supports or does not support MPLS end-to-end dataplane continuity; programming an Internet Protocol (IP) dataplane with each shortest path; and programming an MPLS dataplane with ones of the one or more shortest paths that support the end-to-end MPLS continuity.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a source node in a network of nodes configured to implement a link state protocol, at least some of the nodes enabled for multiprotocol label switching (MPLS):
   discovering and storing a link state topology representing the nodes of the network, links between the nodes, path-costs for the links, and whether each link is enabled or not enabled for MPLS, the discovering including receiving, over the network, from each other node of the network, a respective reachability message that indicates whether the each other node is or is not enabled for MPLS and, for each of one or more adjacencies of the each other node, at least one Internet Protocol (IP) version flag and an MPLS flag each to indicate whether a respective one of the IP version and MPLS is or is not enabled;
   determining one or more shortest paths from the source node to a destination node among the nodes based on traversing the link state topology and, while traversing the link state topology, detecting whether each shortest path supports or does not support end-to-end MPLS dataplane continuity;
   programming an IP dataplane with each shortest path; and
   programming an MPLS dataplane with ones of the one or more shortest paths that support the end-to-end MPLS dataplane continuity.

2. The method of claim 1, wherein the determining includes determining the one or more shortest paths as equal-cost multi-path routing (ECMP) shortest paths.

3. The method of claim 1, wherein the programming the IP dataplane and the programming the MPLS dataplane each include programming a forwarding information base (FIB).

4. The method of claim 3, wherein the programming further includes programming a routing information base (RIB) with the one or more shortest paths.

5. The method of claim 1, wherein the determining and the detecting collectively include iteratively visiting nodes of the network and, for each visited node:

computing shortest paths from the source node to the visited node and neighbors of the visited node to arrive at equal cost multi-paths; and recording an indication of whether the visited node is enabled or not enabled for MPLS, resulting in a respective indication of whether each equal cost multi-path supports or does not support the end-to-end MPLS dataplane continuity.

6. The method of claim 1, wherein the determining includes performing Dijkstra's computation for computing shortest paths across the nodes represented in the link state topology, modified to implement the detecting whether each shortest path supports or does not support the end-to-end MPLS dataplane continuity while performing the computing.

7. The method of claim 1, wherein the at least one IP version flag includes an IPv4 flag and an IPv6 flag each to indicate whether a respective one of IPv4 and IPv6 is or is not enabled.

8. The method of claim 1, wherein the link state protocol includes one of intermediate system to intermediate system (IS-IS), Open Shortest Path First (OSPF), or Border Gateway Protocol (BGP)-Link State (LS) (BGP-LS).

9. The method of claim 1, wherein the determining based on the traversing the link state topology includes traversing the link state topology without traversing any other type of network topology, including an MPLS topology.

10. The method of claim 1, wherein the programming the MPLS dataplane includes programming the MPLS dataplane only with the ones of the one or more shortest paths that support the end-to-end MPLS dataplane continuity.

11. An apparatus comprising:
multiple ports of a source node in a network of nodes configured to implement a link state protocol, at least some of the nodes enabled for multiprotocol label switching (MPLS); and
a processor coupled to the multiple ports and configured to perform:
discovering and storing a link state topology representing the nodes of the network, links between the nodes, path-costs for the links, and whether each link is enabled or not enabled for MPLS, the discovering including receiving, over the network, from each other node of the network a respective reachability message that indicates whether the each other node is or is not enabled for MPLS and, for each of one or more adjacencies of the each other node, at least one Internet Protocol (IP) version flag and an MPLS flag each to indicate whether a respective one of the IP version and MPLS is or is not enabled;
determining one or more shortest paths from the source node to a destination node among the nodes based on traversing the link state topology and, while traversing the link state topology, detecting whether each shortest path supports or does not support end-to-end MPLS dataplane continuity;
programming an IP dataplane with each shortest path; and
programming an MPLS dataplane with ones of the one or more shortest paths that support the end-to-end MPLS dataplane continuity.

12. The apparatus of claim 11, further comprising a routing information database (RIB), wherein the processor is configured to perform the programming by programming the RIB with the one or more shortest paths and an indication of whether each shortest path supports or does not support the end-to-end MPLS dataplane continuity as indicated by the detecting.

13. The apparatus of claim 11, wherein the determining and the detecting collectively include iteratively visiting nodes of the network and, for each visited node:
computing shortest paths from the source node to the visited node and neighbors of the visited node to arrive at equal cost multi-paths; and
recording an indication of whether the visited node is enabled or not enabled for MPLS, resulting in a respective indication of whether each equal cost multi-path supports or does not support the end-to-end MPLS dataplane continuity.

14. The apparatus of claim 11, wherein the processor is configured to perform the determining based on the traversing the link state topology by traversing the link state topology without traversing any other type of network topology, including an MPLS topology.

15. The apparatus of claim 11, wherein the processor is configured to perform the programming the MPLS dataplane by programming the MPLS dataplane only with the ones of the one or more shortest paths that support the end-to-end MPLS dataplane continuity.

16. A non-transitory computer readable medium encoded with instructions that, when executed by a processor of a source node in a network of nodes configured to implement a link state protocol, at least some of the nodes enabled for multiprotocol label switching (MPLS), cause the processor to perform:
discovering and storing a link state topology representing the nodes of the network, links between the nodes, path-costs for the links, and whether each link is enabled or not enabled for MPLS, the discovering including receiving, over the network, from each other node of the network a respective reachability message that indicates whether the each other node is or is not enabled for MPLS and, for each of one or more adjacencies of the each other node, at least one Internet Protocol (IP) version flag and an MPLS flag each to indicate whether a respective one of the IP version and MPLS is or is not enabled;
determining one or more shortest paths from the source node to a destination node among the nodes based on traversing the link state topology and, while traversing the link state topology, detecting whether each shortest path supports or does not support end-to-end MPLS dataplane continuity;
programming an IP dataplane with each shortest path; and
programming an MPLS dataplane with ones of the one or more shortest paths that support the end-to-end MPLS dataplane continuity as detected.

17. The non-transitory computer readable medium of claim 16, wherein the instructions to cause the processor to perform the programming include instructions to cause the processor to perform programming a routing information base (RIB) with the one or more shortest paths and an indication of whether each shortest path supports or does not support the end-to-end MPLS dataplane continuity as indicated by the detecting.

18. The non-transitory computer readable medium of claim 16, wherein the instructions to cause the processor to perform the determining and the detecting collectively include instructions to cause the processor to perform iteratively visiting nodes of the network and, for each visited node:

computing shortest paths from the source node to the visited node and neighbors of the visited node to arrive at equal cost multi-paths; and recording an indication of whether the visited node is enabled or not enabled for MPLS, resulting in a respective indication of whether each equal cost multi-path supports or does not support the end-to-end MPLS dataplane continuity.

19. The non-transitory computer readable medium of claim 16, wherein the instructions to cause the processor to perform the determining based on the traversing the link state topology include instructions to cause the processor to perform traversing the link state topology without traversing any other type of network topology, including an MPLS topology.

20. The non-transitory computer readable medium of claim 16, wherein the instructions to cause the processor to perform the programming the MPLS dataplane include instructions to cause the processor to perform programming the MPLS dataplane only with the ones of the one or more shortest paths that support the end-to-end MPLS dataplane continuity.

* * * * *